United States Patent [19]

Sels et al.

[11] Patent Number: 4,600,552

[45] Date of Patent: Jul. 15, 1986

[54] STRIPPING AIDS FOR CELLULOSE ESTER FILM

[75] Inventors: Francis J. Sels, Kontich; Josephus F. Paulussen, Schilde; Robert J. Pollet, Vremde, all of Belgium

[73] Assignee: Agfa-Gevaert, N.V., Mortsel, Belgium

[21] Appl. No.: 714,199

[22] Filed: Mar. 21, 1985

[30] Foreign Application Priority Data

Apr. 4, 1984 [EP] European Pat. Off. ........ 84200481.4

[51] Int. Cl.$^4$ .................. B28B 1/14; B29C 39/00; C08L 1/08
[52] U.S. Cl. ..................... 264/300; 106/177
[58] Field of Search ............ 106/177; 260/963; 264/300

[56] References Cited

U.S. PATENT DOCUMENTS

| | | | |
|---|---|---|---|
| 2,275,716 | 3/1942 | Bachman | 106/181 |
| 2,872,351 | 2/1959 | Wedell | 260/963 |
| 3,034,909 | 5/1962 | Sams et al. | 260/963 |
| 3,258,833 | 7/1966 | Schuttler | 29/159.1 |
| 3,341,343 | 9/1967 | Beiswanger | 106/177 |
| 3,793,043 | 2/1974 | Dresie et al. | 106/194 |

FOREIGN PATENT DOCUMENTS

| | | | |
|---|---|---|---|
| 040052 | 4/1978 | Japan | 264/300 |
| 933675 | 6/1982 | U.S.S.R. | |

*Primary Examiner*—Theodore Morris
*Attorney, Agent, or Firm*—A. W. Breiner

[57] ABSTRACT

Film-forming cellulose ester compositions containing at least one solvent and at least one phosphate as stripping aid, said phosphate being a mono- or di-$C_{12}$–$C_{20}$alkyl phosphate, the non-esterified hydroxyl group(s) of which is (are) in the free acid form. The invention also relates to a method of manufacturing cellulose ester film, comprising adding to cellulose ester, at least one solvent and at least one above defined phosphate, casting the resulting film-forming cellulose ester composition on a smooth casting surface, and stripping said cellulose ester composition in the form of a film.

11 Claims, No Drawings

STRIPPING AIDS FOR CELLULOSE ESTER FILM

The present invention relates to the incorporation of stripping agents into film-forming cellulose ester compositions to facilitate the stripping of cellulose ester film from the casting surface, upon which it has been formed.

In the manufacture of cellulose ester film it is usual to first dissolve cellulose ester in a solvent or in a mixture of solvents, next to apply the resulting cellulose ester film-forming composition to a smooth surface e.g. a stainless steel belt or a casting cylinder having a nickel-plated or chromium-plated surface, then to evaporate the solvent or mixture of solvents at least partially from the filmforming composition so as to form a film that retains its shape, and finally to strip this film from the surface, upon which it had been cast. A problem is that at the station where tension is applied to detach the film from the casting surface, the film and in particular the film edges may tear, thus causing great damage and disturbance in the film production. Tearing of the film edges may occur more frequently with heterogeneously acetylated cellulose acetate than with the homogeneously acetylated type.

The casting speed depends on the speed, at which the film can be stripped from the casting surface, which stripping speed itself depends on the speed, at which the film attains sufficient strength to be capable of being stripped off without problems. If the stripping of the film is performed before it has reached sufficient strength, delamination may occur so that the coating tends to split within its thickness, leaving part of the film composition adhered to the casting surface.

It is generally known to add stripping aids to the cellulose ester composition to reduce the time evolving between the actual casting and the moment, at which the coating becomes strippable from the casting surface without danger of delamination or tearing of the edges. The stripping aids serve to reduce the tension that is needed to strip the film from the casting surface, and/or to promote the rapid attainment of sufficient film strength, and thus to make it possible to strip the film sooner than could be expected without their use.

However, materials proposed so far for use as stripping aids often exhibit a less than adequate degree of improvement in stripping characteristics and/or cause deleterious effects, which limit the usefulness of the resulting product. For example, the dialkyl esters of sulphosuccinic acid as proposed in U.S. Pat. No. 2,275,716 may accelerate the degradation of cellulose esters; fatty acids as proposed in U.S. Pat. No. 3,528,833 may interfere with the application and adhesion of subsequent coatings; and metallic salts as proposed in U.S. Pat. No. 3,793,043 may impart an undesirable colouration to the film, which interferes with photographic applications.

In an attempt to overcome these problems the WO No. 82/00033, published on Jan. 7, 1982, teaches the use of film-forming cellulose ester compositions containing, as stripping aids, polyethoxylated phosphate esters, the one or two non-esterified hydroxyl group(s) of which may be either in acid form or in salt form.

On the other hand the SU Pat. No. 933,675, published on June 7, 1982, discloses the use of triethanolamine salts of mono- and di-$C_7$–$C_{12}$ alkyl phosphates as stripping aids.

Nevertheless the need remains to further improve the strippability of cellulose ester films from the casting surfaces, on which they have been formed, and to avoid thereby as much as possible the tearing of the film during the stripping operation.

It is therefore an object of the present invention to provide film-forming cellulose ester compositions containing stripping aids that yield superior stripping results than the prior art stripping aids.

It is another object of the present invention to provide a method of manufacturing cellulose ester film, which method comprises the easy and faultless stripping off of said cellulose ester film from the surface, upon which it had been cast.

Other objects of the present invention will become apparent from the disclosure herein.

The above objects are accomplished by the use, in film-forming cellulose ester compositions, of at least one solvent and at least one phosphate as stripping aid, said phosphate being a mono- or di-$C_{12}$–$C_{20}$alkyl phosphate, the non-esterified hydroxyl group(s) of which is (are) in the free acid form.

According to the present invention there is thus provided a method of manufacturing cellulose ester film, comprising adding to cellulose ester, at least one solvent and at least one phosphate as stripping aid, casting the resulting film-forming cellulose ester composition on a smooth casting surface, evaporating said solvent at least partially, and stripping said cellulose ester composition in the form of a film from said casting surface, wherein said phosphate is a mono- or di-$C_{12}$–$C_{20}$alkyl phosphate, the non-esterified hydroxyl group(s) of which is (are) in the free acid form.

The present invention also provides film-forming cellulose ester compositions containing said mono- or di-$C_{12}$–$C_{20}$alkyl phosphates.

According to a preferred embodiment of the present invention the $C_{12}$–$C_{20}$ alkyl group(s) of the phosphate(s) is (are) (a) branched-chain $C_{12}$–$C_{20}$ alkyl group(s).

It has been found very surprisingly that the mono- or di-$C_{12}$–$C_{20}$alkyl phosphates used according to the present invention yield superior stripping results than the triethanolamine salts thereof and than the polyethoxylated phosphates.

The above mono- or di-$C_{12}$–$C_{20}$alkyl phosphates can be prepared according to generally known methods.

It has been established that the synthesis of these alkyl phosphates often yields a mixture of mono- or di-alkyl phosphates, even if the amount of alkanol used for the esterification reaction has been taken so low that one would expect normally to obtain mono-alkyl phosphates.

Representative examples of stripping aids used according to the present invention and corresponding to the following general formula:

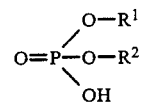

are listed in the following Table 1, the significant of the symbols $R^1$ and $R^2$ being defined in Table 1.

It is to be kept in mind that, when for a compound listed in Table 1 the significance given to $R^2$ is hydrogen, the amount of alkanol used for the esterification reaction had been chosen so as to obtain a mono-alkyl phosphate normally and that, when the significance of $R^2$ in Table 1 is the same as that of $R^1$, the amount of alkanol had been adjusted to normally obtain a dialkyl phosphate.

TABLE 1

| Strip. aid | $R^1$ | $R^2$ |
| --- | --- | --- |
| 1 | 2-hexyldecyl | H |
| 2 | 2-(1-methyl-2-t.butyl-ethyl)-5-methyl-6-t.butyl-n-hexyl | H |
| 3 | n-octadecyl | H |
| 4 | 2-n-butyl-octyl | H |
| 5 | dodecyl | $R^1$ |

Very successful stripping aids that can be used preferentially are mono-(2-hexyldecyl)phosphate, mono-[2-(1-methyl-2-t.butyl-ethyl)-5-methyl-6-t.butyl-n-hexyl]-phosphate, and mono-(2-n-butyl-octyl)phosphate.

The phosphates used in accordance with the present invention are compatible with cellulose esters, as evidenced by the clear films that can be produced from film-forming compositions containing these phosphates. When used in small amounts, they do not adversely influence the characteristics of the film and above all they greatly reduce the time required for stripping the film from the casting surface and the risk of delamination of the film. Moreover, the risk of tearing of the film edges is reduced considerably since the presence of the stripping aids makes it possible to lower the tension that has to be applied to detach the film from the casting surface.

The phosphates used in accordance with the present invention are incorporated into the cellulose ester composition in amounts sufficient to promote stripping of the cellulose ester film from the casting surface. These amounts may range from approximately 0.000002 to approximately 0.02 parts per part by weight of cellulose ester, but preferably from approximately 0.00005 to approximately 0.01 parts per part by weight of said cellulose ester.

The phosphates used in accordance with the present invention are particularly useful in the manufacture of photographic film support from cellulose esters. Cellulose ester films prepared with the aid of these stripping aids exhibit the high degree of transparency needed for this use. Moreover, photographic elements comprising a cellulose ester film support that has been made of the cellulose ester composition comprising these stripping aids do not suffer from any undesirable photographic effects.

Nevertheless, the phosphates of the present invention are useful in any process in which cellulose ester compositions have to be stripped from a casting surface in the form of film or sheeting, regardless of the intended use of the resulting product. As used herein, the term "film" is intended to encompass products of any desired thickness, including those which are very thin and typically referred to as "films" and those of relatively greater thickness, which are typically referred to as "sheet materials".

Cellulose ester film-forming compositions useful in the making of cellulose ester films are generally known. The cellulose esters include acid esters of cellulose such as cellulose acetate, cellulose propionate and cellulose butyrate and mixed acid esters of cellulose such as cellulose acetate propionate, cellulose acetate butyrate and cellulose propionate butyrate. When cellulose acetate is used, it is usually cellulose triacetate and it may be either of the homogeneously or of the heterogeneously acetylated type.

The cellulose ester film-forming composition used in the making of cellulose ester film is made by dissolving cellulose ester in a solvent or in a mixture of solvents in a ratio by weight of from approximately 0.15 to approximately 0.35 parts of cellulose ester per part of solvent medium by weight.

Appropriate solvents for use in the cellulose ester film-forming compositions of the present invention are alcohols, esters, ketones, ethers, glycols, hydrocarbons and halogenated hydrocarbons.

Preferred alcohol solvents for use in the cellulose ester filmforming compositions of the present invention are the lower aliphatic alcohols having 1 to 6 carbon atoms such as e.g. methanol, ethanol, n-propanol, isopropanol, n-butanol, isobutanol, n-pentanol, n-hexanol, etc.

Preferred ester solvents for use in the cellulose ester film-forming compositions of the present invention are methyl acetate, ethyl acetate, n-propyl acetate, isobutyl acetate, ethyl propionate, methyl propionate, ethyl isobutyrate, etc.

Preferred ketone solvents for use in the cellulose ester film-forming compositions of the present invention are acetone, ethyl methyl ketone, methyl n-propyl ketone, diethyl ketone, 2-hexanone, 3-hexanone, tert-butyl methyl ketone, etc.

Other particularly useful solvents include hydrocarbons, such as cyclohexane, and halogenated hydrocarbons, such as methylene chloride and propylene chloride.

It is also possible to use combinations of two or more of the above-mentioned solvents of a same class or combinations of two or more of the above-mentioned solvents selected from different classes. A particularly interesting combination of solvents consists of a mixture of methylene chloride and methanol. The solvent ratio in the latter mixture is preferably in the order of magnitude of 9:1 by volume.

In addition to the cellulose ester and solvent the cellulose ester composition used for forming a cellulose ester film usually also contains a plasticizer. Suitable plasticizers are e.g. dimethyl phthalate, diethyl phthalate, triethyl phosphate, triphenyl phosphate, triethyl citrate, dibutyl sebacate, methoxymethyl phthalate, di-(2-methoxyethyl)phthalate, etc. For use in a cellulose ester composition in accordance with the present invention preference is given, however, to triphenyl phosphate.

The phosphates used in accordance with the present invention dissolve readily in solvents commonly used in the preparation of cellulose ester film-forming compositions.

The following examples illustrate that on the one side the use of a polyethoxylated phosphate stripping aid in acid form leads to an improvement in the stripping of cast cellulose ester film and that the use of a polyethoxylated phosphate in ionized triethanolamine salt form leads to a further improvement in the stripping, that on the other side the use of a $C_8$alkyl phosphate also leads to a minor improvement in the stripping but that ionization of this $C_8$alkyl phosphate into the triethanolamine salt form to conform with SU Pat. No. 933,675 results in a worsening of the stripping and that finally the $C_{12}$–$C_{20}$ alkyl phosphates according to the present invention in acid form unexpectedly yield outstanding results as compared with both the prior art polyethoxylated phosphates and triethanolamine salts of C$_8$alkyl phosphate, the ionization into the triethanolamine salt form of the C$_{12}$-C$_{20}$alkyl phosphates giving a worsening of the stripping result much like in the case of the ionization into the triethanolamine salt of C$_8$alkyl phosphate according to SU Pat. No. 933,675 but strangely enough unlike the ionization into the triethanolamine salt of polyethoxylated phosphate according to WO No. 82/00033.

EXAMPLE 1

A cellulose ester film-forming composition was made by dissolving heterogeneously acetylated cellulose ester in a ratio of 200 g of this cellulose ester containing 30 g of triphenyl phosphate as plasticizer into 1 liter of a solvent mixture consisting of 900 ml of methylene chloride and 100 ml of methanol.

The resulting cellulose ester film-forming composition was divided into 10 identical batches.

Batch A was the comparison batch that contained no stripping aid, whereas the other 9 batches contained a stripping aid as specified hereinafter;

Batch B$_{(acidic)}$: to this batch 1 ml of a 1% by volume solution in methylene chloride, of mono-n-octyl phosphate was added;

Batch B$_{(pH\ 7)}$: same as Batch B$_{(acidic)}$ to the exception that an amount of triethanolamine was added to adjust the pH-value of the batch to 7, at which value one can normally expect the non-esterified hydroxyl groups of the phosphate to have ionized into the triethanolamine salt form, the resulting stripping aid consequently being a triethanolamine salt of C$_8$alkyl phosphate as disclosed in SU Pat. No. 933,675;

Batch B$_{(pH\ 8)}$: same as Batch B$_{(pH\ 7)}$ to the exception that an excess amount of triethanolamine was added to adjust the pH-value of the batch to 8, at which value one can be sure that all non-esterified hydroxyl groups of the phosphate have ionized into the triethanolamine salt form, the resulting stripping aid consequently also being a triethanolamine salt of C$_8$alkyl phosphate as disclosed in SU Pat. No. 933,675;

Batch C$_{(acidic)}$: to this batch 1 ml of a 1% by volume solution in methylene chloride, of 2-n-butyl-octyl phosphate (Stripping aid No. 4) was added;

Batch C$_{(pH\ 7)}$: same as Batch C$_{(acidic)}$ to the exception that an amount of triethanolamine was added to adjust the pH-value of the batch to 7;

Batch C$_{(pH\ 8)}$: same as Batch C$_{(pH\ 7)}$ to the exception that an excess amount of triethanolamine was added to adjust the pH-value of the batch to 8 so as to be sure that all non-esterfied hydroxyl groups of the phosphate have ionized into the triethanolamine salt form;

Batch D$_{(acidic)}$: to this batch 1 ml of a 1% by volume solution in methylene chloride, of 2-hexyldecyl phosphate (Stripping aid No. 1) was added;

Batch D$_{(pH\ 7)}$: same as Batch D$_{(acidic)}$ to the exception that an amount of triethanolamine was added to adjust the pH-value of the batch to 7;

Batch D$_{(pH\ 8)}$: same as Batch D$_{(pH\ 7)}$ to the exception that an excess amount of triethanolamine was added to adjust the pH-value of the batch to 8.

Each of the resulting 10 batches was cast at a temperature of 20° to 22° C. and a relative humidity of 49 to 50% on a different stainless steel plate. The 10 plates were dried for 30 min in an oven at 30° C. The thickness of the cast cellulose ester film varied between 110 and 125 μm.

The adhesive force of the 10 cellulose ester films to the steel plates was then measured by means of the INSTRON Model 1101 strength-testing instrument marketed by Instron Limited, Coronation Road, High Wycombe, Bucks, Great Britain. This instrument continuously measures the weight (in gram) needed to strip a cellulose ester film from a steel plate, which has been fixed to a frame of the instrument.

The maximum weight as well as the average weight values obtained during this measurement are listed in the following Table 2.

TABLE 2

| Batch | Stripping aid | Average stripping weight | Maximum stripping weight |
|---|---|---|---|
| A | none | 740 | 800 |
| B$_{(acidic)}$ | octyl phosphate | 420 | 510 |
| B$_{(pH\ 7)}$ | octyl phosphate | 620 | 650 |
| B$_{(pH\ 8)}$ | octyl phosphate | 550 | 600 |
| C$_{(acidic)}$ | No 4 | 9 | 22 |
| C$_{(pH\ 7)}$ | No 4 | 30 | 45 |
| C$_{(pH\ 8)}$ | No 4 | 75 | 95 |
| D$_{(acidic)}$ | No 1 | 13 | 24 |
| D$_{(pH\ 7)}$ | No 1 | 20 | 30 |
| D$_{(pH\ 8)}$ | No 1 | 400 | 490 |

The comparison of the above results learns that:

the addition of a mono-n-octyl phosphate in acid form reduces the weight needed to strip the film from the steel plate as compared with the film comprising no stripping aid, the addition of mono-n-octyl phosphate in the ionized triethanolamine salt form, which consequently is a stripping aid in accordance with SU No. P 933,675, increases the weight as compared with the acid form and thus renders the stripping of the film more difficult, the addition of Stripping aid No. 4 (comprising a C$_{12}$alkyl) in acid form spectacularly reduces the weight needed to strip the film from the steel plate, the addition of Stripping aid No. 4 in the ionized triethanolamine salt form, although reducing the stripping weight to a favourable extent as compared with the results obtained for the C$_8$ alkyl phosphate according to SU Pat. No. 933,675, manifestly encounters a worsening of the stripping as compared with the results obtained for the acid form of Stripping aid No. 4 according to our invention, the results obtained with Stripping aid No. 1 (comprising a C$_{16}$alkyl) confirm those obtained with Stripping aid No. 4.

EXAMPLE 2

A cellulose ester film-forming composition was prepared as described in Example 1 and divided into 3 identical batches containing a stripping aid as specified hereinafter;

Batch E$_{(acidic)}$: to this batch 1 ml of a 1% by volume solution in methylene chloride, of 2-(1-methyl-2-t.butyl-ethyl)-5-methyl-6-t.butyl-n-hexyl phosphate (Stripping aid No. 2) was added;

Batch E$_{(pH\ 7)}$: same as Batch E$_{(acidic)}$ to the exception that triethanolamine was added to adjust the pH-value of the batch to 7 to ionize most of the non-esterfied hydroxyl groups of the phosphate into the triethanolamine salt form;

Batch E$_{(pH\ 8)}$: same as Batch E$_{(pH\ 7)}$ to the exception that more triethanolamine was added to adjust the pH-value of the batch to 8 to ionize absolutely all the non-esterfied hydroxyl groups of the phosphate into the triethanolamine salt form.

Each of the resulting 3 batches was cast at 22° C. and a relative humidity of 49 to 51% on a different stainless steel plate. The 3 stainless steel plates were dried for 30 min in an oven at 30° C. The thickness of the cast cellulose ester film varied between 95 and 105 μm.

The adhesive force of the 3 cellulose ester films to the stainless steel plates was then determined in the same way as described in Example 1. The results of the measurement are listed in the following Table 3.

TABLE 3

| Batch | Strip. aid | Average stripping weight | Maximum stripping weight |
|---|---|---|---|
| $E_{(acidic)}$ | No 2 | 8 | 13 |
| $E_{(pH\ 7)}$ | No 2 | 40 | 70 |
| $E_{(pH\ 8)}$ | No 2 | 45 | 53 |

The comparison of the above results learns that:
the addition of 2-(1-methyl-2-t.butyl-ethyl)-5-methyl-6-t.butyl-n-hexyl phosphate, which is a mono-$C_{18}$alkyl phosphate according to our invention (Stripping aid No. 2) in acid form results in a spectacularly low weight needed to strip the film from the steel plate,
the addition of Stripping aid No. 2 in the ionized triethanolamine salt form increases the weight as compared with the acid form and thus renders the stripping of the film more difficult.

EXAMPLE 3

A cellulose ester film-forming composition was prepared as described in Example 1 and divided into 5 identical batches.

Batch F was the comparison batch that contained no stripping aid, whereas the other 4 batches contained a stripping aid as specified hereinafter;

Batch $G_{(acidic)}$: to this batch 1 ml of a 1% by volume solution in methylene chloride, of GAFAC RM710 was added, which is the trademark for a polyethoxylated phosphate ester commercially available from GAF Corporation;

Batch $G_{(pH\ 7)}$: same as Batch $G_{(acidic)}$ to the exception that triethanolamine was added to adjust the pH-value of the batch to 7 to ionize most of the non-esterified hydroxyl groups of the polyethoxylated phosphate into the triethanolamine salt form;

Batch $G_{(pH\ 8)}$: same as Batch $G_{(pH\ 7)}$ to the exception that more triethanolamine was added to adjust the pH-value of the batch to 8 to ionize absolutely all the non-esterified hydroxyl groups of the phosphate into the triethanolamine salt form;

Batch $H_{(acidic)}$: to this batch 1 ml of a 1% by volume solution in methylene chloride, of 2-hexyl-decyl phosphate (Stripping aid No. 1), was added.

Each of the resulting 5 batches was cast at 22° C. and a relative humidity of 49 to 51% on a different stainless steel plate. The 5 stainless steel plates were dried for 30 min in an oven at 30° C. The thickness of the cast cellulose ester film varied between 95 and 105 μm.

The adhesive force of the 5 cellulose ester films to the stainless steel plates was then determined in the same way as described in Example 1. The results of the measurement are listed in the following Table 4.

TABLE 4

| Batch | Stripping aid | Average stripping weight |
|---|---|---|
| F | none | 810 |
| $G_{(acidic)}$ | polyethoxylated phosphate | 190 |
| $G_{(pH\ 7)}$ | polyethoxylated phosphate | 67 |
| $G_{(pH\ 8)}$ | polyethoxylated phosphate | 61 |

TABLE 4-continued

| Batch | Stripping aid | Average stripping weight |
|---|---|---|
| $H_{(acidic)}$ | No 1 | 7 |

The comparison of the above resuls learns that:
the addition of a polyethoxylated phosphate ester in accordance with the published WO No. 82/00033 in acid form reduces the weight needed to strip the film from the steel plate as compared with the film comprising no stripping aid,
the addition of a same polyethoxylated phosphate ester in accordance with the published WO No. 82/000332 in triethanolamine salt form reduces the stripping weight even more,
the addition of 2-hexyl-decyl phosphate, which is a $C_{16}$alkyl phosphate according to out invention (Stripping aid No. 1) in acid form reduces the stripping weight spectacularly.

We claim:
1. A composition comprising a cellulose ester, at least one solvent, and at least one phosphate as stripping aid, said composition comprising a mono- or di-$C_{12}$-$C_{20}$alkyl phosphate, the non-esterfied hydroxyl group(s) of which is (are) in the free acid form.

2. Composition according to claim 1, comprising a mono- or di-$C_{12}$-$C_{20}$alkyl phosphate, the alkyl group(s) of which is (are) (a) branched-chain alkyl group(s).

3. Composition according to claim 2, comprising a mono- or di-$C_{12}$-$C_{20}$alkyl phosphate selected from the group consisting of mono-(2-hexyldecyl)phosphate, mono-[2-(1-methyl-2-t.butyl-ethyl)-5-methyl-6-t.butyl-n-hexyl]phosphate, and mono-(2-n-butyl-octyl)phosphate.

4. Composition according claim 1, wherein said cellulose ester is cellulose acetate and said solvent consists of a mixture of methylene chloride and methanol in a ratio by volume of 9:1.

5. Composition according to claim 1, wherein said composition also contains triphenyl phosphate as plasticizer.

6. Composition according to claim 1, wherein said mono- or di-$C_{12}$-$C_{20}$alkyl phosphate is present in an amount of from approximately 0.00005 to approximately 0.01 parts per part by weight of said cellulose ester.

7. A method of manufacturing cellulose ester film, comprising adding to cellulose ester, at least one solvent and at least one phosphate, casting the resulting film-forming cellulose ester composition on a smooth casting surface, evaporating said solvent at least partially, and stripping said cellulose ester composition in the form of a film from said casting surface, wherein said phosphate is a mono- or di-$C_{12}$-$C_{20}$alkyl phosphate, the non-esterified hydroxyl group(s) of which is (are) in the free acid form.

8. Method according to claim 7, wherein a mono- or di-$C_{12}$-$C_{20}$alkyl phosphate is used, the alkyl group(s) of which is (are) (a) branched-chain alkyl group(s).

9. Method according to claim 8, wherein said mono- or di-$C_{12}$-$C_{20}$alkyl phosphate is one selected from the group consisting of mono-(2-hexyl-decyl)phosphate, mono-[2-(1-methyl-2-t.butyl-ethyl)-5-methyl-6-t.butyl-n-hexyl]phosphate, and mono-(2-n-butyl-octyl)phosphate is used.

10. Method according to claims 7, wherein said mono- or di-$C_{12}$-$C_{20}$alkyl phosphate is used in an amount of from approximately 0.00005 to approximately 0.01 parts per part by weight of said cellulose ester.

11. Method according to claim 7, wherein said casting surface is an endless stainless steel belt or a large cylinder having a polished nickel-plated or chromium-plated surface.

* * * * *